US 10,705,504 B2
Jul. 7, 2020

(12) United States Patent
Kurosawa

(54) INFORMATION MANAGEMENT SYSTEM, SERVER, INFORMATION MANAGEMENT METHOD, AND STORAGE MEDIUM

(71) Applicant: FANUC CORPORATION, Yamanashi (JP)

(72) Inventor: Tadashi Kurosawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 15/876,867

(22) Filed: Jan. 22, 2018

(65) Prior Publication Data

US 2018/0217577 A1 Aug. 2, 2018

(30) Foreign Application Priority Data

Jan. 27, 2017 (JP) ................... 2017-013586

(51) Int. Cl.
  *G05B 19/418* (2006.01)
  *G05B 19/4063* (2006.01)
(52) U.S. Cl.
  CPC ..... *G05B 19/4063* (2013.01); *G05B 19/4183* (2013.01); *G05B 19/41855* (2013.01); *Y02P 90/02* (2015.11); *Y02P 90/30* (2015.11)
(58) Field of Classification Search
  None
  See application file for complete search history.

(56) References Cited

U.S. PATENT DOCUMENTS

2009/0198648 A1   8/2009   Middleton et al.
2010/0023156 A1*  1/2010   Trepina ............... G05B 19/406
                                                          700/175
2017/0083004 A1*  3/2017   Clement .............. G05B 19/414

FOREIGN PATENT DOCUMENTS

| CN | 1601417 A | 3/2005 |
|---|---|---|
| CN | 101923679 A | 12/2010 |
| CN | 102650869 A | 8/2012 |

(Continued)

OTHER PUBLICATIONS

An Office Action mailed by the Japanese Patent Office dated Aug. 28, 2018, which corresponds to Japanese Patent Application No. 2017-013586 and is related to U.S. Appl. No. 15/876,867.

(Continued)

*Primary Examiner* — Thomas C Lee
*Assistant Examiner* — Gary Collins
(74) *Attorney, Agent, or Firm* — Studebaker & Brackett PC

(57) ABSTRACT

A server for storing a machining result of a machine tool and one or a plurality of first terminals connected to the server via a network are included. The server includes an information disclosure part for disclosing the machining result, a request acceptance part for accepting from each of the first terminals a request for the machining result disclosed by the information disclosure part, and a machining condition provision part for providing each of the first terminals with a machining condition corresponding to the machining result in response to the request accepted by the request acceptance part. Each of the first terminals includes a request transmission part for transmitting the request for the machining result disclosed by the information disclosure part, and a machining condition acquisition part for acquiring the machining condition provided by the machining condition provision part in response to the request.

13 Claims, 13 Drawing Sheets

(56) References Cited

FOREIGN PATENT DOCUMENTS

| | | |
|---|---|---|
| CN | 104008201 A | 8/2014 |
| CN | 105700478 A | 6/2016 |
| EP | 2 713 320 A1 | 4/2014 |
| JP | 2002-230317 A | 8/2002 |
| JP | 2003-168030 A | 6/2003 |
| JP | 2006-171796 A | 6/2006 |
| JP | 2010-146537 A | 7/2010 |
| WO | 02/003156 A1 | 1/2002 |

OTHER PUBLICATIONS

An Office Action mailed by the German Patent Office dated Oct. 9, 2019, which corresponds to German Patent Application No. 10 2018 201 083.8 and is related to U.S. Appl. No. 15/876,867; with partial English language translation.
An Office Action mailed by the State Intellectual Property Office of the People's Republic of China dated May 5, 2019, which corresponds to Chinese Patent Application No. 201810067461.9 and is related to U.S. Appl. No. 15/876,867.

* cited by examiner

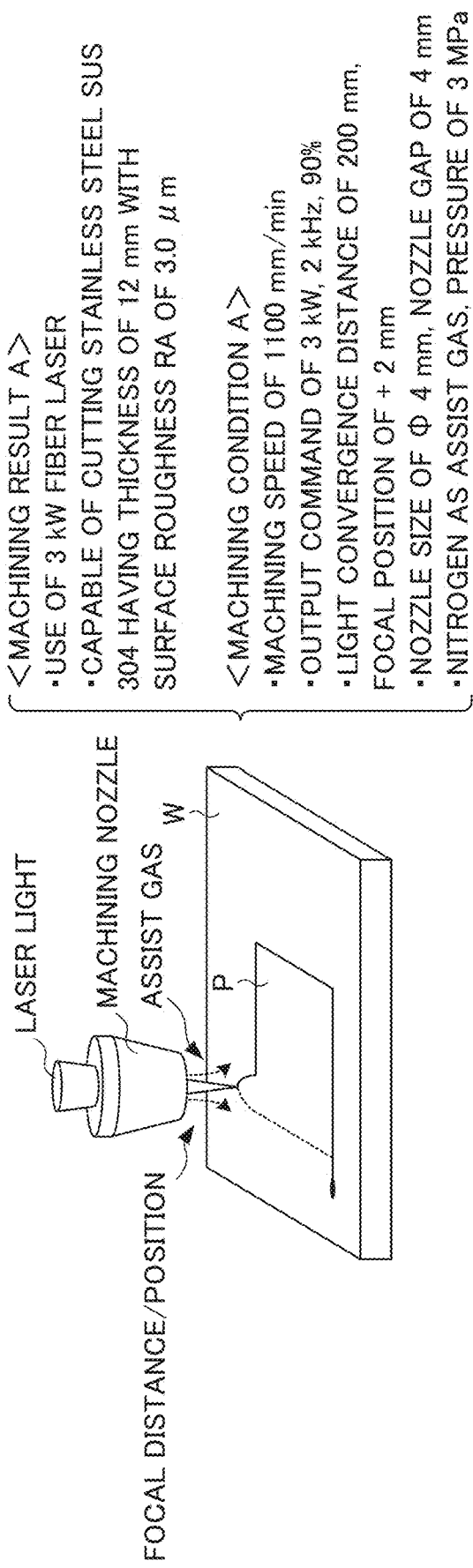

FIG. 4

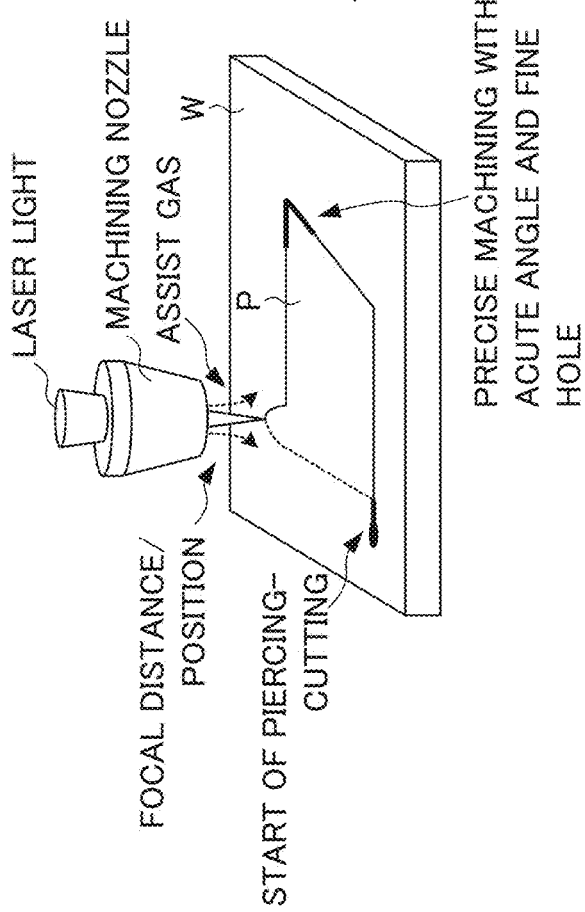

<Machining Result B, Machining Result C>
- Use of 6 kW CO₂ laser
- Capable of starting stable cutting after piercing for 3 seconds to mild steel SS400 having thickness of 35 mm
- Capable of precisely machining with acute angle of 30 degrees <Machining Condition B>
Piercing condition:
- Output command of 6 kW, 200 Hz, 70%
- Light convergence distance of 190 mm, focal position of +3 mm
- Nozzle size of Φ 4 mm, nozzle gap of 10 mm
- Oxygen as assist gas, pressure of 0.08 MPa Cutting start condition:
- Output command of 4 kW, 100 Hz, 50%
- Machining by 2.5 mm at cutting speed of 150 mm/min <Machining Condition C>
Cutting start condition (acute angle of 30 degrees):
- Output command of 4 kW, 200 Hz, 70%
- Machining by 3.5 mm at cutting speed of 250 mm/min
- Have stopping time for 0.2 seconds or longer at corner vertex

FIG. 5

| MACHINING TECHNOLOGY INFORMATION ID | PROVIDING SOURCE | MACHINING CONDITION | MACHINING RESULT | NUMBER OF REQUESTS | APPROVAL RESULT |
|---|---|---|---|---|---|
| 0001 | COMPANY A | ... | ... | 2 | APPROVAL |
| 0002 | COMPANY B | ... | ... | 8 | NON-APPROVAL |
| 0003 | COMPANY C | ... | ... | 6 | SPECIFIED (APPROVAL-WAITING) |
| ... | ... | ... | ... | ... | ... |

FIG. 6

| ITEM | MACHINING RESULT | MACHINING CONDITION | REMARK |
|---|---|---|---|
| WORKPIECE (MATERIAL, PLATE THICKNESS, SURFACE) | ○ | △ | WORKPIECE SELECTION, ESPECIALLY SURFACE TREATMENT OTHER THAN MATERIAL, PLATE THICKNESS, ETC., MAY CORRESPOND TO KNOW-HOWS IN SOME CASES. |
| MACHINING SPEED | △ | ○ | MACHINING SPEED MAY BE MACHINING RESULT INDICATING PRODUCTIVITY |
| LASER TYPE, RATED OUTPUT | ○ | | EQUIPMENT INFORMATION AS PREMISE IS CLASSIFIED AS MACHINING RESULT |
| CUTTING QUALITY | ○ | | INDICATE MACHINING RESULT DIRECTLY AFFECTING VALUE OF MACHINING KNOW-HOWS |
| LASER OUTPUT COMMAND | | ○ | PULSE PEAK, FREQUENCY, DUTY |
| LIGHT CONVERGENCE CONDITION | | ○ | FOCAL DISTANCE, FOCAL POSITION |
| ASSIST GAS | △ | ○ | TYPE OF GAS, PRESSURE, NOZZLE SHAPE, NOZZLE GAP |
| MACHINING TYPE, SHAPING TREATMENT | ○ | ○ | MACHINING CONDITIONS OTHER THAN STRAIGHT LINE CUTTING, SUCH AS PIERCING AND ACUTE ANGLE CUTTING OUTLINE PART MAY BE MACHINING RESULT |

FIG. 9

| CATEGORY | NUMBER OF REQUESTS | PROVIDING SOURCE | CONTENTS OF MACHINING RESULT | VOTE |
|---|---|---|---|---|
| NEW MACHINING RESULT | ★☆☆☆ (2 VOTES) | COMPANY A | USE OF 6 kW CARBON DIOXIDE LASER STABLE MACHINING OF FINE HOLE OF Φ 10 mm TO MILD STEEL SS400 HAVING THICKNESS OF 25 mm | REQUEST |
| ... | ... | ... | ... | ... |
| BOOMING MACHINING RESULT | ★★★☆ (8 VOTES) | COMPANY B | USE OF 3 kW FIBER LASER CUTTING OF STAINLESS STEEL SUS 304 HAVING THICKNESS OF 12 mm WITH SURFACE ROUGHNESS Ra of 7 μm (CUT SURFACE) | REQUEST |
|  | ★★★☆ (6 VOTES) | COMPANY C | USE OF 2 kW FIBER LASER CUTTING OF ALUMINUM A5052 HAVING THICKNESS OF 8 mm AT SPEED OF 80 mm/min | REQUEST |
| ... | ... | ... | ... | ... |

FIG. 15

| CATEGORY | NUMBER OF PURCHASING | PROVIDING SOURCE | CONTENTS OF MACHINING RESULT | APPROVAL STATUS | PURCHASE |
|---|---|---|---|---|---|
| NEW MACHINING RESULT | ★★☆☆☆ (2) | COMPANY A | USE OF 6 kW CARBON DIOXIDE LASER STABLE MACHINING OF FINE HOLE OF Φ 10 mm TO MILD STEEL SS400 HAVING THICKNESS OF 25 mm | APPROVED BY BUILDER | APPLICATION FOR PURCHASE |
| ... | ... | ... | ... | ... | ... |
| BOOMING MACHINING RESULT | ★★★★☆ (8) | COMPANY B | USE OF 3 kW FIBER LASER CUTTING OF STAINLESS STEEL SUS 304 HAVING THICKNESS OF 12 mm WITH SURFACE ROUGHNESS Ra of 7 μm (CUT SURFACE) | NOT APPROVED | APPLICATION FOR PURCHASE |
| ... | ★★★☆☆ (6) | COMPANY C | USE OF 2 kW FIBER LASER CUTTING OF ALUMINUM A5052 HAVING THICKNESS OF 8 mm AT SPEED OF 80 mm/min | APPROVED BY COMPANY Z | APPLICATION FOR PURCHASE |
| ... | ... | ... | ... | ... | ... |

FIG. 16

| JOB SHOP NAME | LEVEL OF MACHINING SKILL | APPEAL INFORMATION | CONTACT |
|---|---|---|---|
| COMPANY A | ★★★★★ | REPUTATION IN CUTTING QUALITY OF THICK STAINLESS PLATE | ACQUIRE CONTACT |
| COMPANY B | ★★★★☆ | CONFIDENT IN PRECISE MACHINING TECHNOLOGY OF THICK SOFT STEEL PLATE | ACQUIRE CONTACT |
| COMPANY C | ★★☆☆☆ | CONFIDENT IN HIGH-SPEED MACHINING<br>LEAVE MACHINING FOR SHORT DELIVERY PERIOD TO US | ACQUIRE CONTACT |
| ⋮ | ⋮ | ⋮ | ⋮ |

INFORMATION MANAGEMENT SYSTEM, SERVER, INFORMATION MANAGEMENT METHOD, AND STORAGE MEDIUM

This application is based on and claims the benefit of priority from Japanese Patent Application No. 2017-013586, filed on 27 Jan. 2017, the content of which is incorporated herein by reference.

BACKGROUND OF THE INVENTION

Field of the Invention

The present invention relates to an information management system, a server, an information management method, and a storage medium.

Related Art

Conventionally, a system for providing a user of a machine tool with information on machining conditions and the like of the machine tool to is known. For example, Patent Document 1 discloses a machining supporting monitoring system in which, when a user side inquires of a host side (a maintaining side) machining conditions such as material, machining process and finishing accuracy concerning a plurality of same-type machine tools and same-type machining contents, the host side transmits teaching and machining data of collected optimum machining conditions to the user side, and the same-type machine tool of the user side reads the machining data to perform machining to material under the optimum machining conditions.

Patent Document 1: Japanese Unexamined Patent Application, Publication No. 2010-146537

SUMMARY OF THE INVENTION

However, the technology described in Patent Document 1 premises that the host side collects the machining conditions executed by respective users. On the other hand, in some cases, a user of a machine tool develops original machining conditions superior than the standard machining conditions recommended by a machine tool builder, and operates the machine tool under the original machining conditions. Such a user is not always positive in disclosing the original machining conditions, and thus it is difficult for the host side to collect the machining conditions. Even if another user obtains specific user's original machining conditions, operation of the machine tool under other machining conditions than the standard machining conditions recommended by the machine tool builder is risky from the viewpoint of operation guarantee, safety and the like. In particular, in a machine tool such as a laser machine, there is a tendency to avoid machining under the conditions deviating from the standard machining conditions recommended by a manufacturer. Furthermore, it is not always easy for a machine tool builder to perform development for giving a guarantee to such original machining conditions because it is difficult to grasp the needs to specific user's original machining conditions. As described above, in the conventional technology, it is difficult to appropriately support development and distribution of machining technology.

The object of the present invention is to provide an information management system, a server, an information management method, and a program allowing more appropriate support of development and distribution of machining technology.

(1) An information management system according to the present invention (for example, an information management system 1, which will be described below) includes a server (for example, an information management server 10, which will be described below) for storing a machining result of a machine tool, and one or a plurality of first terminals (for example, user terminals 30, which will be described below) connected to the server via a network (for example, a network 40, which will be described below). The server includes an information disclosure part (for example, an information disclosure part 11b, which will be described below) for disclosing the machining result, a request acceptance part (for example, a request acceptance part 11c, which will be described below) for accepting from each of the first terminals a request for the machining result disclosed by the information disclosure part, and a machining condition provision part (for example, a machining condition provision part 11e, which will be described below) for providing each of the first terminals with a machining condition corresponding to the machining result in response to the request accepted by the request acceptance part. Each of the first terminals includes a request transmission part (for example, a request transmission part 31e, which will be described below) for transmitting the request for the machining result disclosed by the information disclosure part, and a machining condition acquisition part (for example, a machining technology information acquisition part 31f, which will be described below) for acquiring the machining condition provided by the machining condition provision part in response to the request.

(2) The information management system according to (1) further includes a second terminal (for example, a builder terminal 20, which will be described below) used by a verifier for verifying the machining condition of the machine tool. The second terminal includes a verification result transmission part (a verification result input acceptance part 21b) for transmitting to the server a verification result indicating whether or not to approve the machining condition corresponding to the machining result relevant to the accepted request. When the verification result indicating approval of the machining condition is transmitted by the verification result transmission part, the machining condition provision part may set the machining condition as a target of provision.

(3) In the information management system according to (2), the server may further include a machining condition approval part (for example, a machining condition approval part 11d, which will be described below) for specifying as a target to be verified by the second terminal the machining condition corresponding to the machining result receiving requests a threshold number of times or more. The verification result transmission part may transmit the verification result indicating whether or not to approve the machining condition specified by the machining condition approval part.

(4) In the information management system according to any one of (1) to (3), the information disclosure part may disclose at least the machining result and a number of the requests made for the machining result.

(5) In the information management system according to any one of (1) to (3), the information disclosure part may disclose at least the machining result and a number of the provided machining conditions corresponding to the machining result.

(6) In the information management system according to any one of (1) to (5), the server may further include an information collecting part (for example, an information collecting part 11a, which will be described below) for acquiring the machining result and the machining condition corresponding to the machining result from the plurality of first terminals.

(7) In the information management system according to any one of (1) to (6), the server may further include a consideration processing part (for example, a consideration processing part 11f, which will be described below) for executing a processing concerning payment of consideration to a providing source of the machining condition provided by the machining condition provision part.

(8) In the information management system according to (7), the consideration processing part may execute a processing concerning payment of money to the providing source of the machining condition as the processing concerning payment of consideration.

(9) In the information management system according to (7), the consideration processing part may execute a processing of presenting information for recommending the providing source of the machining condition as the processing concerning payment of consideration.

(10) In the information management system according to (7) or (8), the consideration processing part may execute the processing concerning payment of consideration based on an amount of a consideration presented by the providing source or a destination of the machining condition.

(11) A server according to the present invention is a server connected to one or a plurality of first terminals via a network, for storing a machining result of a machine tool. The server includes an information disclosure part for disclosing the machining result, a request acceptance part for accepting from each of the first terminals a request for the machining result disclosed by the information disclosure part, and a machining condition provision part for providing each of the first terminals with a machining condition corresponding to the machining result in response to the request accepted by the request acceptance part.

(12) An information management method according to the present invention is an information management method executed in an information management system including server for storing a machining result of a machine tool and one or a plurality of first terminals connected to the server via a network. The server executes information disclosure for disclosing the machining result, request acceptance for accepting from each of the first terminals a request for the machining result disclosed in the information disclosure, and machining condition provision for providing each of the first terminals with a machining condition corresponding to the machining result in response to the request accepted in the request acceptance. Each of the first terminals executes request transmission for transmitting the request for the machining result disclosed in the information disclosure, and machining condition acquisition for acquiring the machining condition provided in the machining condition provision in response to the request.

(13) A program according to the present invention makes a computer including a server connected to one or a plurality of first terminals via a network, the server storing a machining result of a machine tool, achieve an information disclosure function for disclosing the machining result, a request acceptance function for accepting from each of the first terminals a request for the machining result disclosed by the information disclosure function, and a machining condition provision function for providing each of the first terminals with a machining condition corresponding to the machining result in response to the request accepted by the request acceptance function.

The present invention enables to provide an information management system, a server, an information management method, and a program capable of more appropriately supporting development and distribution of machining technology.

BRIEF DESCRIPTION OF THE DRAWINGS

FIG. 3 is a schematic diagram illustrating an example of machining result and machining condition.

FIG. 4 is a schematic diagram illustrating another example of machining result and machining condition.

FIG. 5 is a schematic diagram illustrating the contents of a machining technology DB.

FIG. 6 is a schematic diagram illustrating an example of applicability of each item to machining result or machining condition.

FIG. 9 is a schematic diagram illustrating an example of a user interface screen displayed on the user terminal.

FIG. 15 is a schematic diagram illustrating an example of a user interface screen displayed on a user terminal in a modification 2.

FIG. 16 is a schematic diagram illustrating an example of a display screen for presenting information recommending a user of a machine tool who has provided a machined product ordering side with machining technology information, as a consideration for provision of the machining technology information.

DETAILED DESCRIPTION OF THE INVENTION

Figure 1:
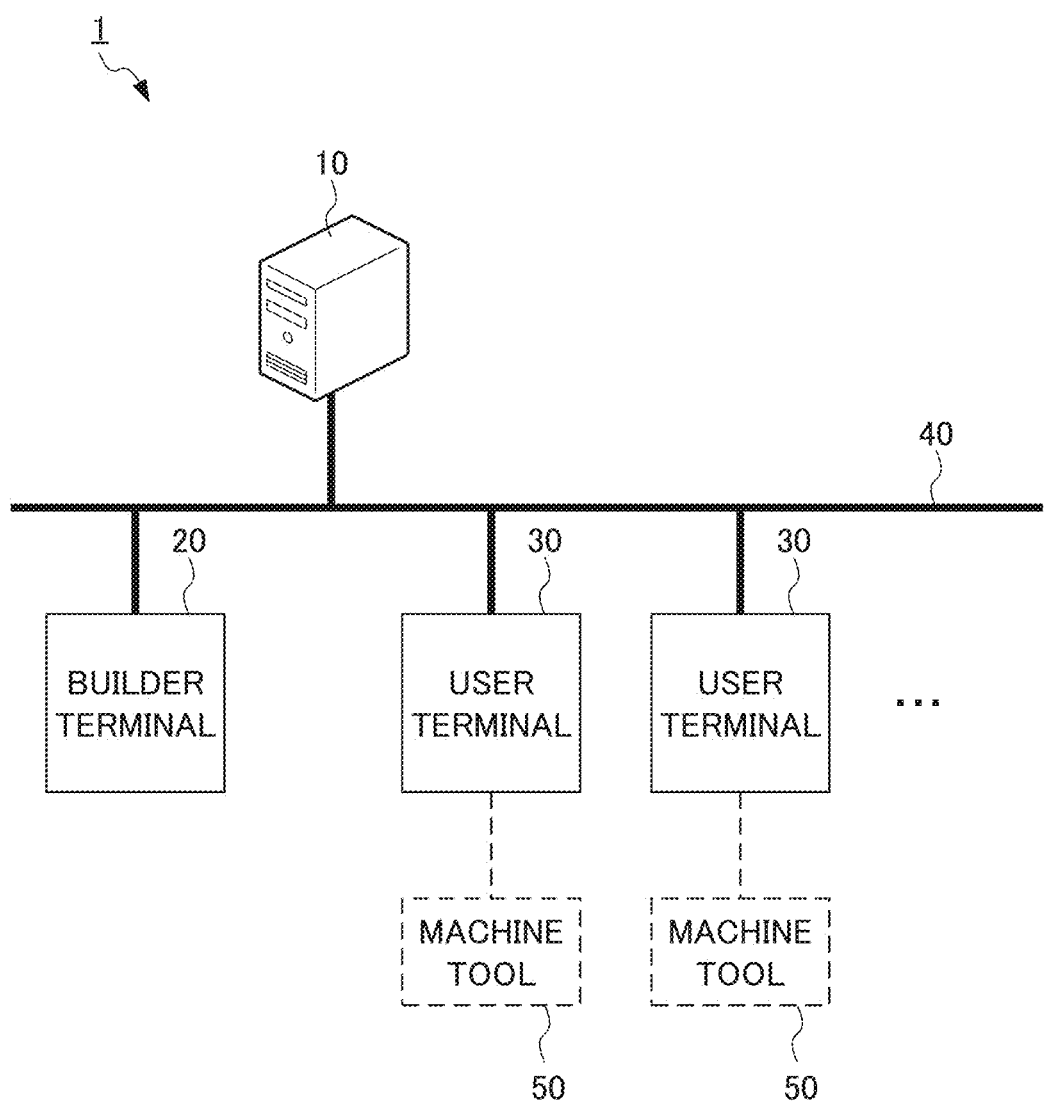
FIG. 1 is a schematic diagram illustrating a system configuration of an information management system according to one embodiment of the present invention.

Hereinafter, embodiments according to the present invention will be described with reference to the drawings.
Configuration FIG. 1 is a schematic diagram illustrating a system configuration of an information management system 1 according to one embodiment of the present invention. As shown in FIG. 1, the information management system 1 is configured to include an information management server 10, a builder terminal 20 and a plurality of user terminals 30 so as to be communicatively connected to each other via a network 40 such as the Internet or Virtual Private Network (VPN). In the present embodiment, the case where the information management system 1 supports development and distribution of machining technology of a laser machine as a machine tool 50 is described as an example. It is noted that "machining condition(s)" in the description below includes various conditions which affect machining result, such as setting contents of the machine tool (laser machine) 50 and know-hows at the time of machining.

The information management server 10 collects the machining conditions executed by users of the laser machine 50 and the machining results under the machining conditions from the user terminals 30, and accumulates the machining technology information in which the collected machining conditions and machining results are correlated with each other in a database (hereinafter referred to as "machining technology database" or "machining technology DB").

The information management server 10 discloses the machining results of the machining technology information accumulated in the machining technology database to each user of the laser machine 50, and accepts from each user a request for the machining technology information corresponding to the machining result. When accepting requests from users a threshold number of times or more, the information management server 10 specifies the machining technology information as a target to be verified for a guarantee by a machine tool builder. Then, the machine tool builder (verifier) performs verification on the machining technology information (development including testing in operation and effects and the like). When the machining technology information is set as a guarantee object, the information management server 10 sets the machining condition of the machining technology information as a target of provision to the users of the laser machine 50. Thereafter, the information management server 10 provides the user who has made such a request with the machining condition of the machining technology information. In the present embodiment, in the case where the machining technology information is provided, the user who has made such a request pays a predetermined consideration (corresponding to money herein) under the management by the information management server 10, and a part or all of the consideration paid by the user is paid to a user of the laser machine 50 who is a providing source of the machining technology information.

Figure 2:
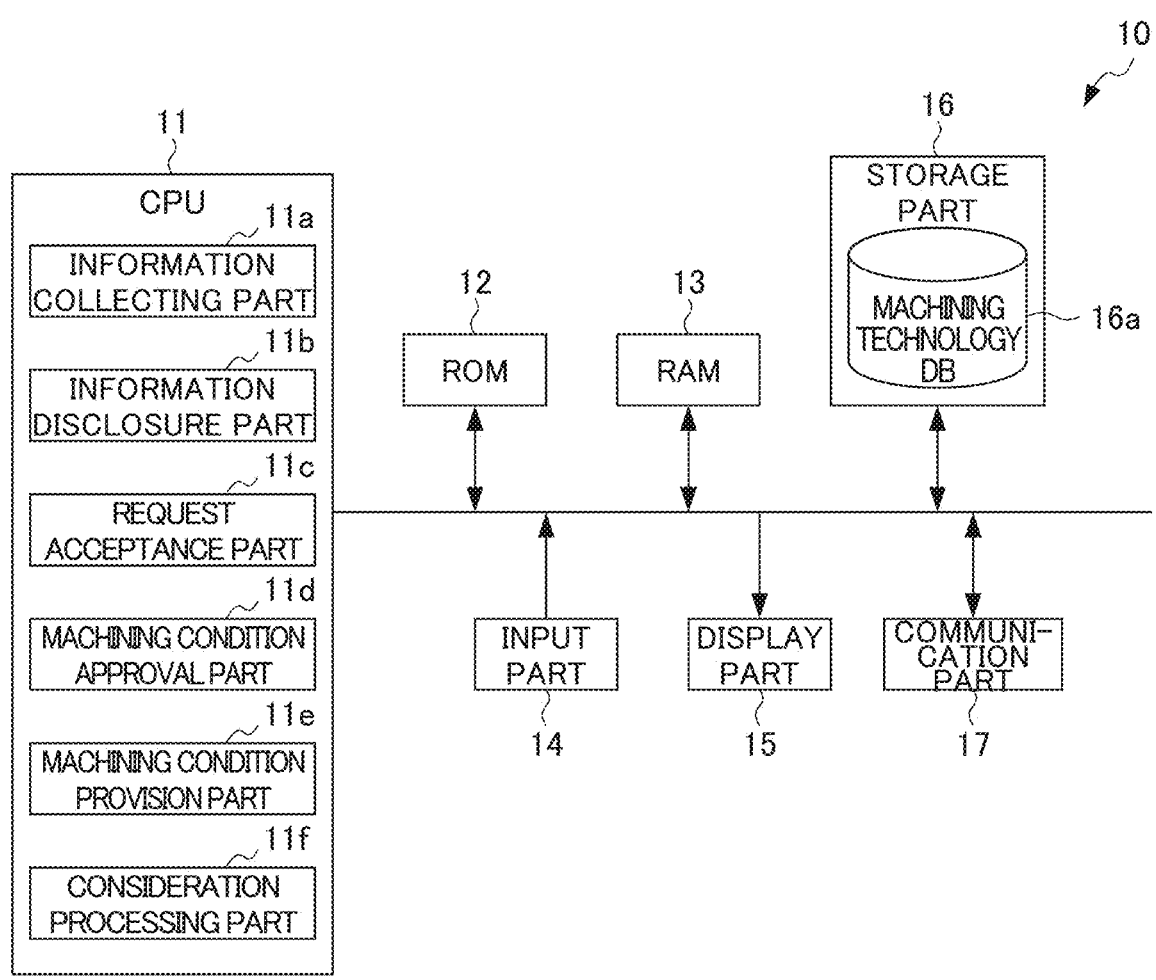
FIG. 2 is a block diagram illustrating a configuration of an information management server 10.

FIG. 2 is a block diagram illustrating the configuration of the information management server 10. As shown in FIG. 2, the information management server 10 includes a Central Processing Unit (CPU) 11, a Read Only Memory (ROM) 12, a Random Access Memory (RAM) 13, an input part 14, a display part 15, a storage part 16, and a communication part 17.

The CPU 11 controls the entire of the information management server 10 by executing various programs stored in the storage part 16. In an example, the CPU 11 executes a program for a series of processing of collecting the machining technology information from a plurality of users of the laser machine 50 (refer to FIG. 1), disclosing the machining result, accepting requests from the users, and providing the users with the machining technology information receiving many requests, after verification by a machine tool builder (hereinafter, referred to as "information management processing").

The execution of the program for the information management processing functionally forms an information collecting part 11a, an information disclosure part 11b, a request acceptance part 11c, a machining condition approval part 11d, a machining condition provision part 11e and a consideration processing part 11f, in the CPU 11. The information collecting part 11a collects the machining conditions and the machining results (machining technology information; executed by users of the laser machine 50 from the user terminals 30, and accumulates the collected machining technology information in the machining technology database (a machining technology DB 16a, which will be described below). It is noted that, in the present embodiment, the information collecting part 11a collects the machining technology information, triggered when each of the user terminals 30 makes an application for provision of the machining technology information.

Each of FIG. 3 and FIG. 4 is a schematic diagram illustrating an example of the machining result and the machining condition. In the example shown in FIG. 3, each of the following items is defined as a machining result when a laser machine cuts out a component shape P from a workpiece W.

Machining result A
Use of 3 kW fiber laser
Capable of cutting stainless steel SUS 304 having thickness of 12 mm with surface roughness Ra of 3.0 μm
Each of the following items is defined as a machining condition for realizing the machining result.
Machining condition A
Machining speed of 1100 mm/min
Output command of 3 kW, 2 kHz, 90%
Light convergence distance of 200 mm, Focal position of +2 mm
Nozzle size of Φ 4 mm, Nozzle gap of 4 mm
Nitrogen as assist gas, Pressure of 3 MPa In the example shown in FIG. 4, each of the following items is defined as a machining result when the laser machine cuts out the component shape P from the workpiece W.

Machining result B, Machining result C
Use of 6 kWCO$_2$ laser
Capable of starting stable cutting after piercing for 3 seconds to mild steel SS400 having thickness of 35 mm
Capable of accurately machining with acute angle of 30 degrees
Each of the following machining conditions B, C is defined as a machining condition for realizing the machining result.
Machining condition B
Piercing condition:
Output command of 6 kW, 200 Hz, 70%
Light convergence distance of 190 mm, Focal position of +3 mm
Nozzle size of Φ4 mm, Nozzle gap of 10 mm
Oxygen as assist gas, Pressure of 0.08 MPa.
Cutting start condition:
Output command of 4 kW, 100 Hz, 50%
Machining by 2.5 mm at cutting speed of 150 mm/min
Machining condition C
Cutting start condition (acute angle of 30 degrees):
Output command of 4 kW, 200 Hz, 70%
Machining by 3.5 mm at cutting speed of 250 mm/min
Have stopping time for 0.2 seconds or longer at corner vertex The information disclosure part 11b discloses the machining results of the machining technology information accumulated in the machining technology DB 16a to each user. The request acceptance part 11c accepts from each user a request for the machining technology information corresponding to the machining result disclosed by the information disclosure part 11b.

When accepting requests from users a preset threshold number of times or more, the machining condition approval part 11d specifies the machining technology information as a target to be verified for a guarantee by the machine tool builder. When the machine tool builder verifies the machining technology information, and when the approval information for setting the machining technology information as a guarantee object is received from the builder terminal 20, the machining condition approval part 11d sets the machining condition of the machining technology information as a target of provision to a user of the laser machine. When receiving the non-approval information for not setting the machining technology information as a guarantee object from the builder terminal 20, the machining condition approval part 11d sets the machining condition of the machining technology information not as a target of provision to a user of the laser machine.

The machining condition provision part 11e provides the user who has made a request for the machining technology information with the machining technology information (machining conditions). The consideration processing part 11f requests the user who has made the request for the machining technology information to pay for the machining technology information, and executes processing concerning payment of consideration (such as electronic settlement). In the present embodiment, on condition that the consideration processing part 11f has completed the processing concerning payment of consideration, the machining condition provision part 11e provides the machining conditions.

In the ROM 12, various system programs for controlling the information management server 10 are written in advance. The RAM 13, which is configured with a semiconductor memory such as a DRAM, stores the data generated when the CPU 11 executes various types of processing. The input part 14, which is configured with an input device such as a keyboard, a mouse or a touch panel, accepts input of various types of information by a user to the information management server 10. The display part 15, which is configured with a display device such as a Liquid Crystal Display (LCD), displays various processing results of the information management server 10. It is noted that, in the present embodiment, the information management server 10 may be configured without the input part 14 or the display part 15, wherein inputting and outputting may be remotely controlled by an external terminal device.

The storage part 16, which is configured with a non-volatile storage device such as a hard disk or a flash memory, stores programs and the like for the information management processing. The storage part 16 stores the machining technology database (machining technology DB) 16a in which the machining conditions and the machining results (machining technology information) executed by users of the laser machine are accumulated (refer to FIG. 3). The communication part 17, which includes a communication interface for performing signal processing based on a predetermined communication standard such as a wired or wireless LAN or a Universal Serial Bus (USB), controls communication performed by the information management server 10 via the network 40.

FIG. 5 is a schematic diagram illustrating the contents of the machining technology DB 16a. As shown in FIG. 5, in the machining technology DB 16a, a machining technology information ID for identifying machining technology information, a providing source of machining technology information, a machining condition, a machining result, a number of requests made for machining technology information, and an approval result of machining condition are stored in association with one another. The machining technology information ID is information for identifying machining technology information. In the present embodiment, a numerical number specific to each piece of the machining technology information is assigned as the machining technology information ID. The providing source of machining technology information indicates a user of the laser machine who has provided the machining technology information.

The machining condition indicates the machining conditions of the laser machine collected by the information collecting part 11a. Specifically, the machining condition includes a nozzle type used in a laser machining, a gap to a workpiece, a type of assist gas, an assist gas pressure and the like. The machining result indicates the machining results of the laser machine collected by the information collecting part 11a. Specifically, the machining result includes material of a workpiece, a plate thickness, a cutting speed and the like.

The number of requests made for machining technology information indicates the number of times requests for machining technology information are made by users of the laser machine. The approval result of machining condition indicates the verification result of the machining technology information by the machine tool builder. Specifically, the approval result of machining condition includes "Approval" indicating that the item is approvable as a standard machining condition recommended by the machine tool builder, "Non-approval" indicating that the item is not approvable as a standard machining condition recommended by the machine tool builder, and "Specified (Approval-waiting)" indicating that the item is specified as a target to be verified for a guarantee by the machine tool builder (that the item is under approval-waiting state).

The specific contents of the machining results and the machining conditions of the machining technology information can be variously defined according to the object of machining, machining form and the like. That is, even among the items generally considered as a constitution element of the machining condition (such as a machining speed), some items directly affecting productivity of the laser machine or cost can be constitution elements of the machining result. Similarly, even among the items generally considered as a constitution element of the machining result (such as a workpiece), a detailed part of a machining target can be a constitution element of the machining condition. That is, each item in the machining technology information is not fixedly classified into the machining result or the machining condition.

FIG. 6 is a schematic diagram illustrating an example of applicability of each item to the machining result or the machining condition. It is noted that, in FIG. 6, "Circle" in the columns of the machining result and the machining condition indicates that the item is applicable, while "Triangle" indicates that the item may be applicable in some conditions. As shown in FIG. 6, the items included in the machining technology information are workpiece (material, plate thickness, surface), machining speed, laser type/rated output, cutting quality, laser output command, light convergence condition, assist gas, machining type/shaping treatment and the like. In general, the workpiece among them is considered as a machining result. However, workpiece selection, especially surface treatment other than material, plate thickness, etc., may correspond to know-hows in some cases. In this case, the workpiece may be a constitution element of the machining condition.

In general, the machining speed is considered to be a machining condition. However, the machining speed also indicates productivity, and thus may be a constitution element of the machining result. In general, the assist gas is considered to be a machining condition. However, in the case of premising the machining performed by use of a specific assist gas, the assist gas may be a constitution element of the machining result. In general, the machining type/shaping treatment, which indicates a cutting shape other than a straight line such as piercing or acute angle cutting, is considered to be a machining condition. However, when considering the machining type; shaping treatment itself as an object to be achieved, the machining type/shaping treatment may be a constitution element of the machining result.

Again as shown in FIG. 1, the builder terminal 20, which is configured with an information processing apparatus such as a Personal Computer (PC), acquires the machining technology information specified by the information management server 10 as a target to be verified. The builder terminal 20 then accepts input of the verification result as to whether or not the machining condition indicated in the machining technology information is approvable as a standard machining condition recommended by the machine tool builder. In the case where the verification result indicating that the machining condition indicated in the machining technology information is approvable as a standard machining condition recommended by the machine tool builder is input, the builder terminal 20 transmits to the information management server 10 the approval information for setting the machining technology information as a guarantee object. In the case where the verification result indicating that the machining condition indicated in the machining technology information is not approvable as a standard machining condition recommended by the machine tool builder is input, the builder terminal 20 transmits to the information management server 10 the non-approval information for not setting the machining technology information as a guarantee object.

Figure 7:
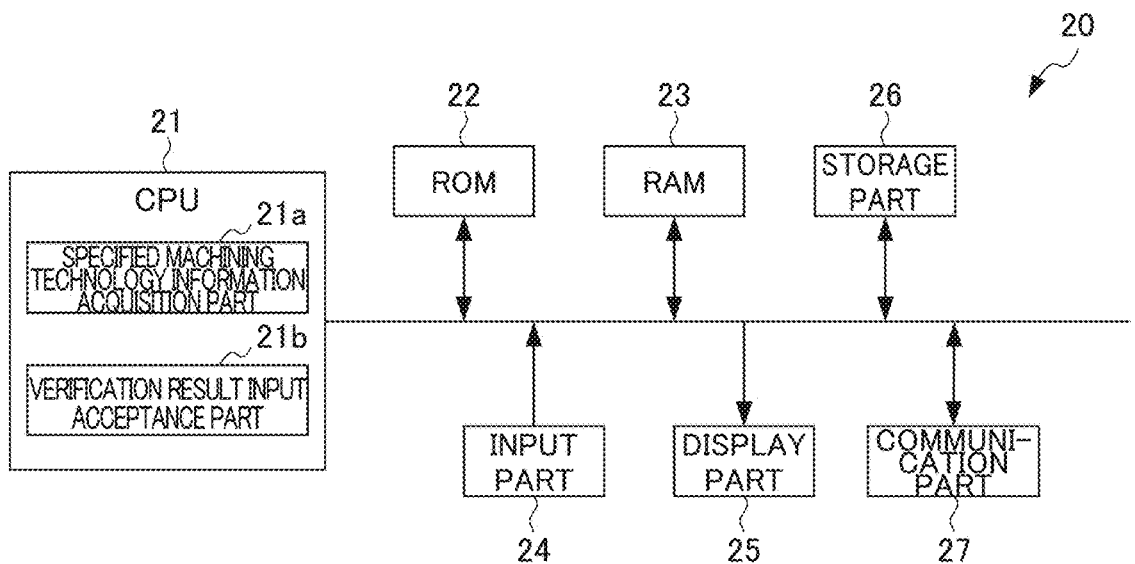
FIG. 7 is a block diagram illustrating a configuration of a builder terminal.

FIG. 7 is a block diagram illustrating the configuration of the builder terminal 20. As shown in FIG. 7, the builder terminal 20 includes a CPU 21, a ROM 22, a RAM 23, an input part 24, a display part 25, a storage part 25, and a communication part 27.

The CPU 21 controls the entire of the builder terminal 20 by executing various programs stored in the storage part 26. In an example, the CPU 21 executes a program for processing of acquiring the machining technology information specified by the information management server 10 as a target to be verified for a guarantee by the machine tool builder, and transmitting the verification result made by the machine tool builder to the information management server 10 (hereinafter, referred to as "verification result transmission processing").

The execution of the program for the verification result transmission processing functionally forms a specified machining technology information acquisition part 21a and a verification result input acceptance part 21b, in the CPU 21. In the case where the machining technology information is specified by the information management server 10 as a target to be verified for a guarantee by the machine tool builder, the specified machining technology information acquisition part 21a acquires the machining technology information. The machine tool builder verifies the machining technology information acquired in such a manner with respect to the machining condition and the machining result, and determines whether or not the machining technology information is approvable (enabled to be guaranteed) as a standard machining condition recommended by the machine tool builder from the viewpoint of an operation guarantee, safety and the like.

The verification result input acceptance part 21b accepts input of the verification result of the machining technology information acquired by the specified machining technology information acquisition part 21a. Specifically, the verification result input acceptance part 21b accepts input of "Approval" indicating that the machining technology information acquired by the specified machining technology information acquisition part 21a is approvable as a standard machining condition recommended by the machine tool builder, or "Non-approval" indicating that the machining technology information is not approvable as a standard machining condition recommended by the machine tool builder. Then, the verification result input acceptance part 21b transmits the information indicating the input verification result (approval information indicating "Approval" or non-approval information indicating "Non-approval") to the information management server 10.

In the ROM 22, various system programs for controlling the builder terminal 20 are written in advance. The RAM 23, which is configured with a semiconductor memory such as a DRAM, stores the data generated when the CPU 21 executes various types of processing. The input part 24, which is configured with an input device such as a keyboard, a mouse or a touch panel, accepts input of various types of information by a user to the builder terminal 20. The display part 25, which is configured with a display device such as an LCD, displays various processing results of the builder terminal 20.

The storage part. 26, which is configured with a nonvolatile storage device such as a hard disk or a flash memory, stores programs and the like for the verification result transmission processing. The communication part 27, which includes a communication interface for performing signal processing based on a predetermined communication standard such as a wired or wireless LAN or a USB, controls communication performed by the builder terminal 20 via the network 40.

Again as shown in FIG. 1, each of the user terminals 30, which is configured with an information processing apparatus such as a PC, provides the machining technology information to the information management server 10. Each of the user terminals 30 transmits a request for the machining result disclosed by the information management server 10. In the case where the machining technology information corresponding to the machining result is approved by the machine tool builder, each of the user terminals 30 receives the machining technology information on condition of payment of a predetermined consideration. In the present embodiment, each of the user terminals 30, which has a function as a controller for controlling the laser machine, manages information on control, such as various setting conditions in the laser machine (such as machining technology information) and detection results by a sensor.

Figure 8:
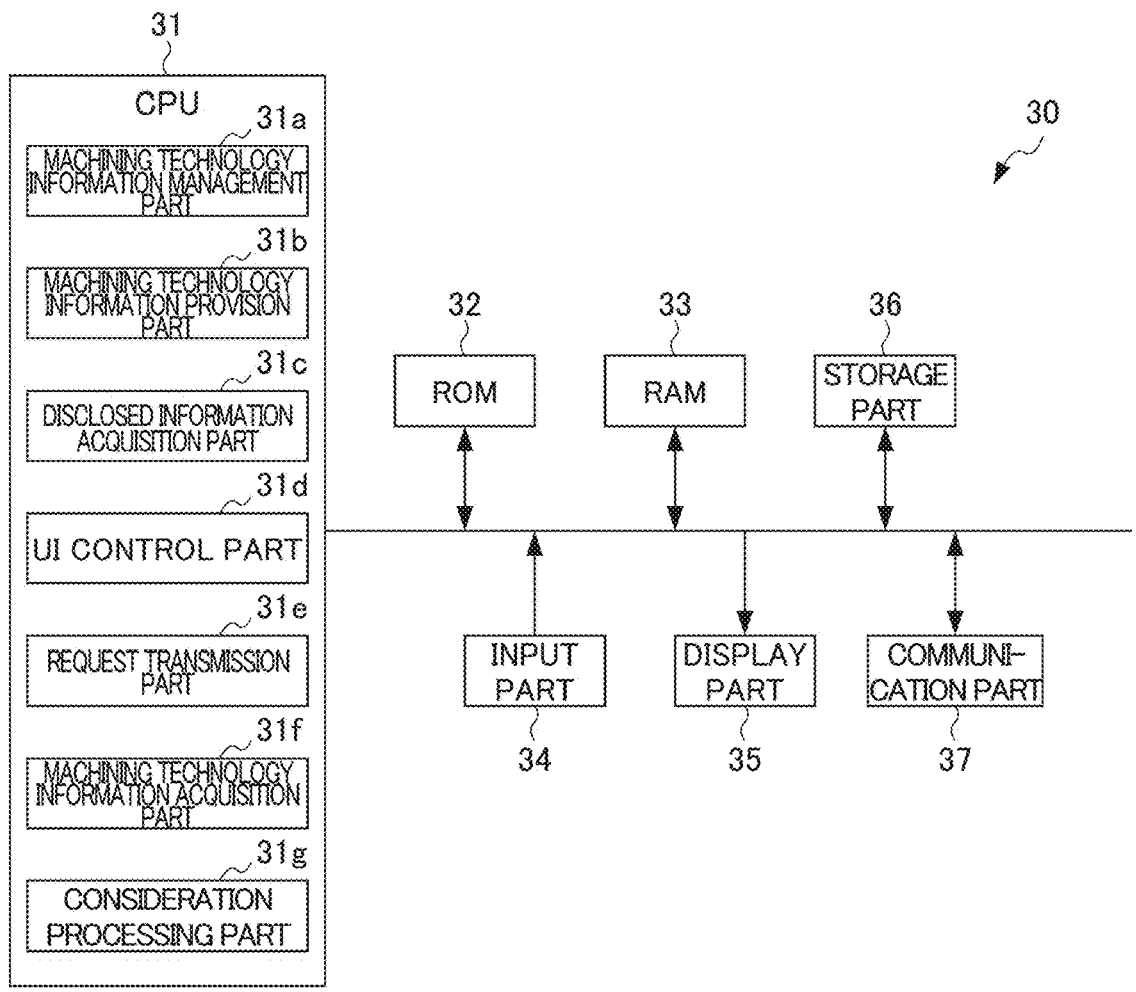
FIG. 8 is a block diagram illustrating a configuration of a user terminal.

FIG. 8 is a block diagram illustrating the configuration of each of the user terminals 30. As shown in FIG. 8, each of the user terminals 30 includes a CPU 31, a ROM 32, a RAM 33, an input part 34, a display part 35, a storage part 36, and a communication part 37. The CPU 31 controls the entire of the user terminal 30 by executing various programs stored in the storage part 36. In an example, the CPU 31 executes a program for processing of providing the information management server 10 with the machining technology information (hereinafter referred to as "machining technology information provision processing") or a program for processing of receiving the machining technology information corresponding to the machining result disclosed by the information management server 10 (hereinafter referred to as "machining technology information acquisition processing").

The execution of the programs for the machining technology information provision processing and the machining technology information acquisition processing functionally forms a machining technology information management part 31a, a machining technology information provision part 31b, a disclosed information acquisition part 31c, a user interface control part (UI control part) 31d, a request transmission part 31e, a machining technology information acquisition part 31f, and a consideration processing part 31g, in the CPU 31.

The machining technology information management part 31a successively acquires information on control, such as various setting conditions in the laser machine controlled by the user terminal 30 (such as machining technology information) and detection results by a sensor, and stores them in the storage part 36. It is noted that the machining technology information management part 31a is capable of acquiring the comment information (such as know-hows and notes) input by a user and storing it in the storage part 36 as a part of the machining technology information (for example, additional information with respect to the machining condition). In response to the operation for providing the information management server 10 with the machining condition in the laser machine controlled by the user terminal 30, the machining technology information provision part 31b makes an application for provision of machining technology information to the information management server 10. Specifically, the machining technology information provision part 31b transmits the information for making an application for provision of machining technology information and the machining technology information set as a target of provision (machining result and machining condition) to the information management server 10. As a result, the information management server 10 discloses the machining result of the machining technology information.

The disclosed information acquisition part 31c acquires a list of the machining technology information (machining results) disclosed by the information management server 10. The user interface control part (UI control part) 31d displays a user interface screen including the list of the machining technology information acquired by the disclosed information acquisition part 31c and request buttons for respective pieces of the machining technology information, and accepts an operation of requesting each piece of the machining technology information. The UI control part 31d appropriately displays the result of the request for each piece of the machining technology information (whether or not each piece of the machining technology information has been acquired) on the user interface screen.

FIG. 9 is a schematic diagram illustrating an example of the user interface screen displayed on the user terminal 30. As shown in FIG. 9, on the user interface screen, items including category of machining technology information, number of requests having been made up to the present (number of requests), providing source of machining technology information, contents of machining result, and request button for requesting (voting) displaying are respectively displayed for each piece of the machining technology information. A user of the laser machine using each of the user terminals 30 is able to confirm the contents of the machining results displayed on the user interface screen, and make a request for the machining technology information by pressing each request button when desiring the machining condition.

The request transmission part 31e transmits to the information management server 10 a request which has been made on the user interface screen displayed by the UI control part 31d through a requesting operation of requesting provision of the machining technology information. In the case where the machining technology information the request for which has been transmitted by the request transmission part 31e is approved by the machine tool builder and is set as a target of provision, the machining technology information acquisition part 31f acquires the machining technology information (machining condition) from the information management server 10. The consideration processing part 31g executes the processing concerning payment of consideration (such as electronic settlement) with respect to the consideration for the machining technology information acquired by the machining technology information acquisition part 31f.

In the ROM 32, various system programs for controlling the user terminal 30 are written in advance. The RAM 33, which is configured with a semiconductor memory such as a DRAM, stores the data generated when the CPU 31 executes various types of processing. The input part 34, which is configured with an input device such as a keyboard, a mouse or a touch panel, accepts input of various types of information by a user to the user terminal 30. The display part 35, which is configured with a display device such as an LCD, displays various machining results of the user terminal 30.

The storage part 36, which is configured with a non-volatile storage device such as a hard disk or a flash memory, stores programs and the like for the machining technology information provision processing and the machining technology information acquisition processing. The communication part 37, which includes a communication interface for performing signal processing based on a predetermined communication standard, such as a wired or wireless LAN or a USB, controls the communication performed by the user terminal 30 via the network 40.

Operation

Next, the operation of the information management system 1 is described,

Information Management Processing

Figure 10:
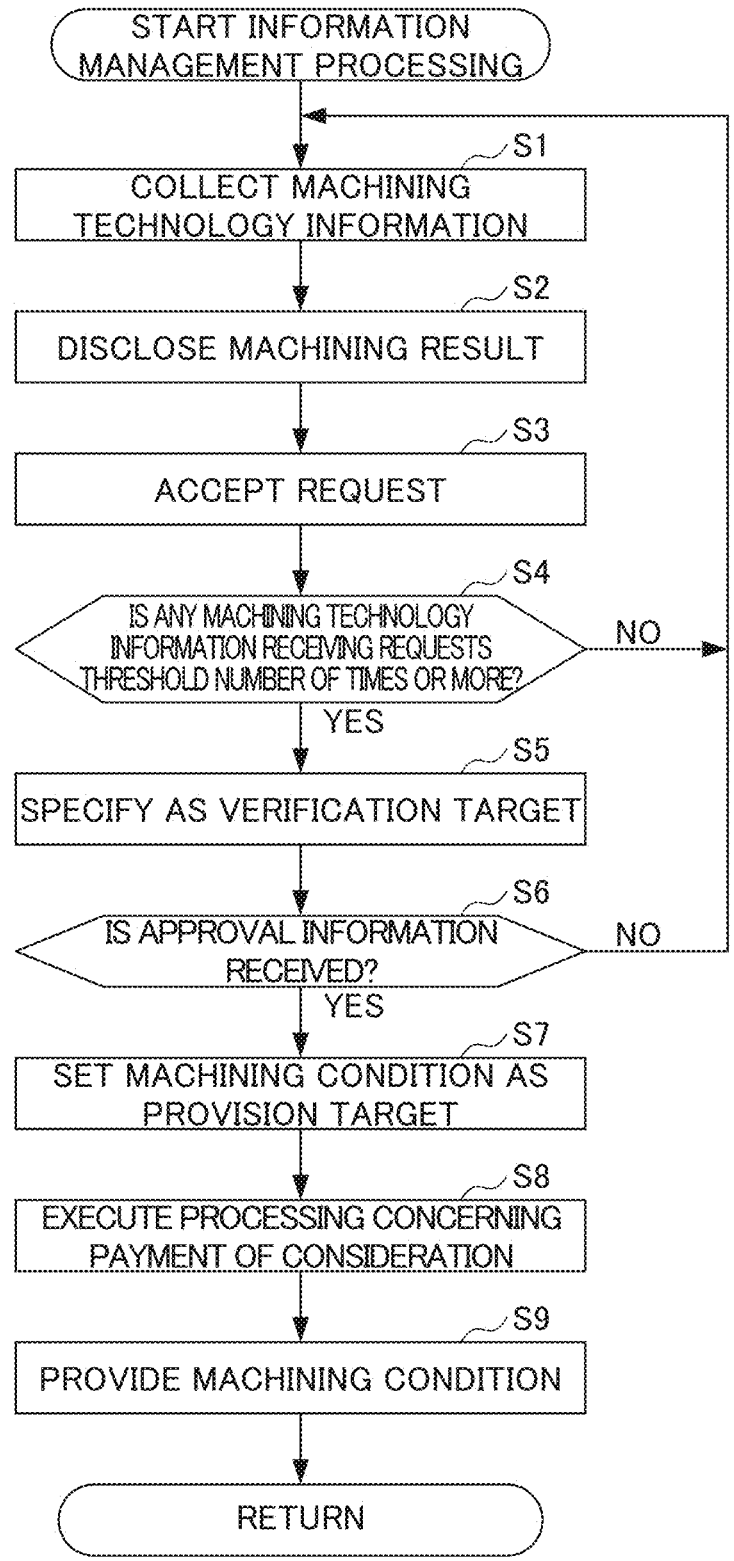
FIG. 10 is a flowchart explaining the flow of information management processing executed by a CPU of the information management server.

FIG. 10 is a flowchart explaining the flow of the information management processing executed by the CPU 11 of the information management server 10. The information management processing is started upon input via the input part 14, of an instruction to start the information management processing.

After the information management processing is started, in step S1, the information collecting part 11a collects the machining conditions and the machining results (machining technology information) executed by users of the laser machine from the user terminals 30. The machining technology information collected at this time is accumulated in the machining technology DB 16a, in step S2, the information disclosure part 11b discloses the machining results of the machining technology information accumulated in the machining technology DB 16a to each user. In step S3, the request acceptance part 11c accepts from each user a request for the machining technology information corresponding to the machining result disclosed by the information disclosure part 11b.

In step S4, the machining condition approval part 11d determines whether or not there is any piece of the machining technology information receiving requests a preset threshold number of times or more from users. In the case where there is a piece of the machining technology information receiving requests a preset threshold number of times or more from users, the determination in step S4 is made as YES, and the processing moves to step S5. In the case where there is no machining technology information receiving requests a preset threshold number of times or more from users, the determination in step S4 is made as NO, and the processing moves to step S1. In step S5, the machining condition approval part 11d specifies the machining technology information receiving requests a preset threshold number of times or more from users, as a target to be verified for a guarantee by the machine tool builder.

In step S6, the machining condition approval part 11d determines whether or not the approval information for setting as a guarantee object the machining technology information specified as a target to be verified has been received from the builder terminal 20. In the case where the approval information for setting as a guarantee object the machining technology information specified as a target to be verified has been received from the builder terminal 20, the determination in step S6 is made as YES, and the processing moves to step S7. In the case where the approval information for setting as a guarantee object the machining technology information specified as a target to be verified has not been received from the builder terminal 20, the determination in step S6 is made as NO, and the processing moves to step S1.

In step S7, the machining condition approval part 11d sets the machining condition of the machining technology information, the approval information to which has been received, as a target of provision to a user of the laser machine. In step S8, the consideration processing part 11f requests the user who has made a request for the machining technology information to pay the consideration for the machining technology information, and executes the processing concerning payment of consideration (such as electronic settlement). In step S9, the machining condition provision part 11e provides the user who has made a request for the machining technology information set as a target of provision, with the machining technology information (machining condition). After step S9, the information management processing is repeated.

Verification Result Transmission Processing

Figure 11:
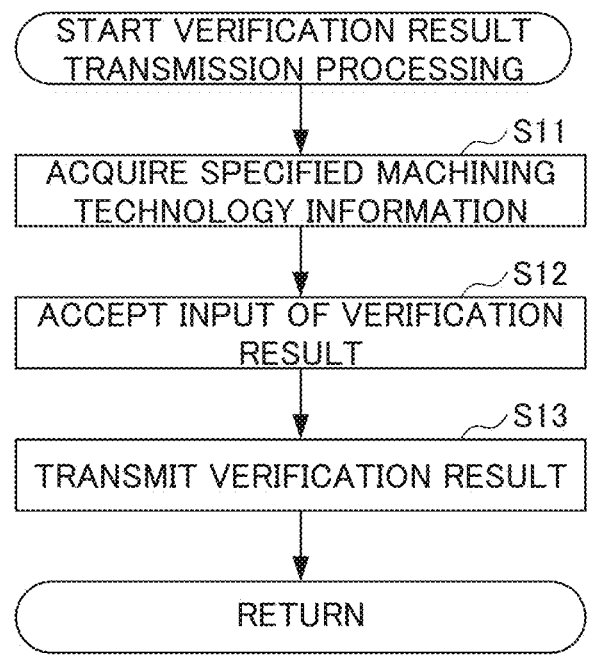
FIG. 11 is a flowchart explaining the flow of verification result transmission processing executed by a CPU of the builder terminal.

FIG. 11 is a flowchart explaining the flow of the verification result transmission processing executed by the CPU 21 of the builder terminal 20. The verification result transmission processing is started upon input via the input part 24, of an instruction to start the verification result transmission processing. After the verification result transmission processing is started. In step S11, the specified machining technology information acquisition part 21a acquires the machining technology information specified by the information management server 10 as a target to be verified for a guarantee by the machine tool builder.

In step S12, the verification result input acceptance part 21b accepts input of the verification result of the machining technology information acquired by the specified machining technology information acquisition part 21a. In step S13, the verification result input acceptance part 21b transmits the information indicating the input verification result (approval information indicating "Approval" or non-approval information indicating "Non-approval") to the information management server 10. After step S13, the verification result transmission processing is repeated.

Machining Technology Information Provision Processing

Figure 12:
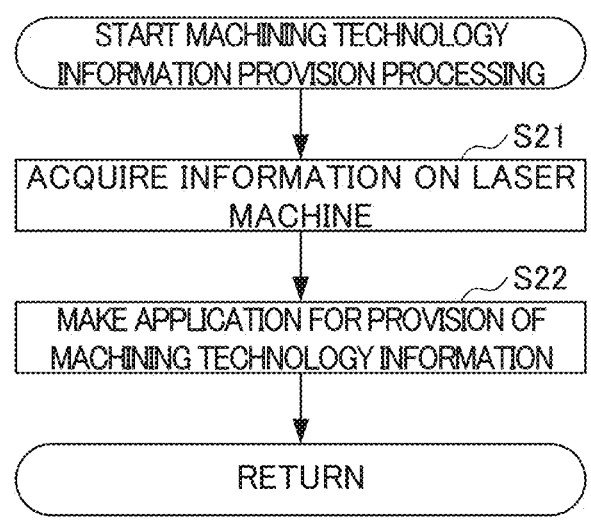
FIG. 12 is a flowchart explaining the flow of machining technology information provision processing executed by a CPU of the user terminal.

FIG. 12 is a flowchart for explaining the flow of the machining technology information provision processing executed by the CPU 31 of the user terminal 30. The machining technology information provision processing is started upon input via the input part 34, of an instruction to start the machining technology information provision processing. After the machining technology information provision processing is started, in step S21, the machining technology information management part 31a acquires information on control such as various setting conditions in the laser machine controlled by the user terminal 30 (such as machining technology information) and detection results by a sensor. The information on the laser machine acquired at this time is stored in the storage part 36. In step S21, the machining technology information management part 31a appropriately acquires the comment information (such as know-hows and notes) input by a user, and stores it in the storage part 36 as a part of the machining technology information (additional information or the like to the machining condition).

In step S22, in response to the operation for providing the information management server 10 with the machining condition in the laser machine controlled by the user terminal 30, the machining technology information provision part 31b makes an application for provision of the machining technology information to the information management server 10. After step S22, the machining technology information provision processing is repeated.

Machining Technology Information Acquisition Processing

Figure 13:
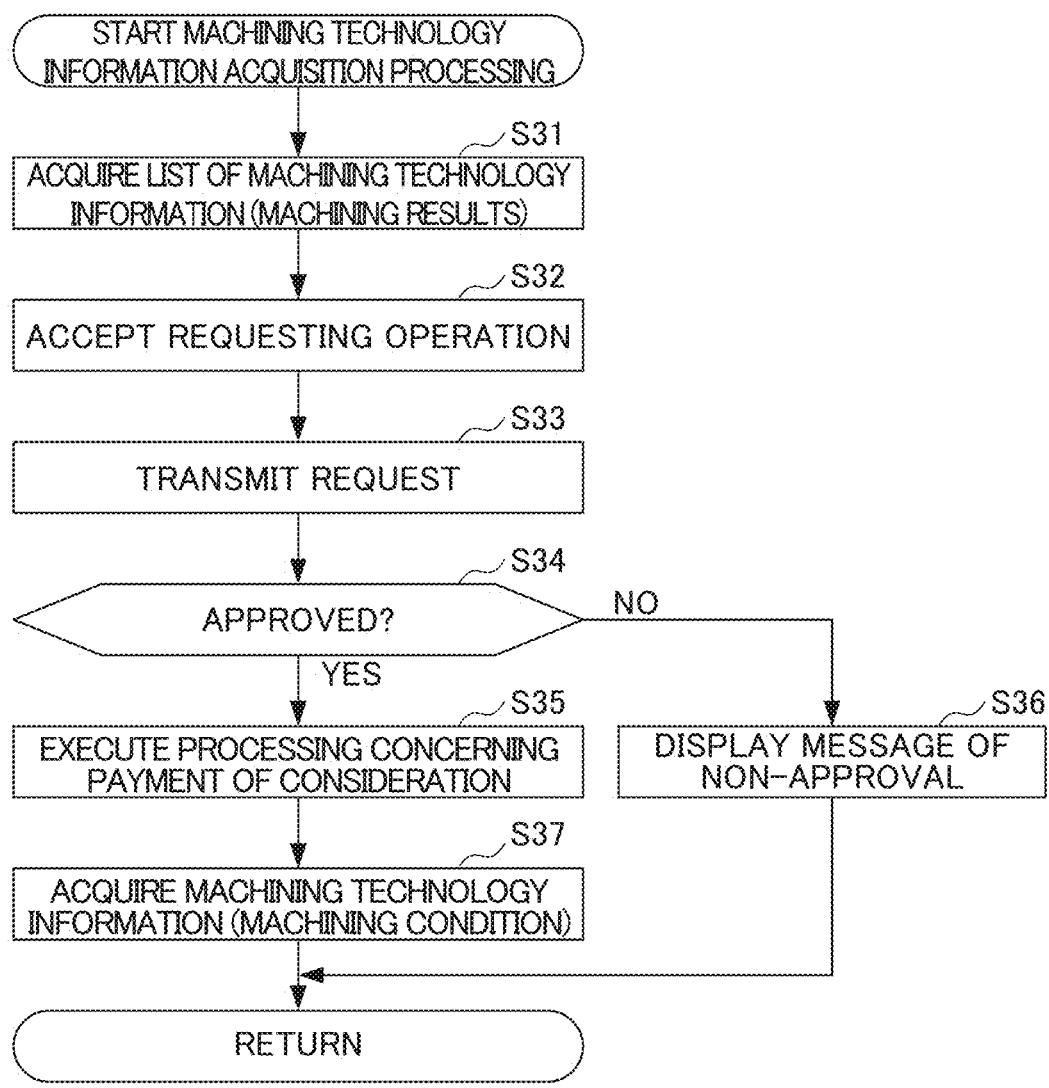
FIG. 13 is a flowchart explaining the flow of machining technology information acquisition processing executed by the CPU of the user terminal.

FIG. 13 is a flowchart for explaining the flow of the machining technology information acquisition processing executed by the CPU 31 of the user terminal 30. The machining technology information acquisition processing is started upon input via the input part 34, of an instruction to start the machining technology information acquisition processing. After the machining technology information acquisition processing is started, in step S31, the disclosed information acquisition part 31c acquires a list of the machining technology information (machining results) disclosed by the information management server 10.

In step S32, the UI control part 31d displays the user interface screen including the list of the machining technology information acquired by the disclosed information acquisition part 31c and request buttons for respective pieces of the machining technology information, and accepts an operation of requesting each piece of the machining technology information. In step S33, the request transmission part 31e transmits to the information management server 10 a request which has been made on the user interface screen through a requesting operation of requesting provision of the machining technology information.

In step S34, the machining technology information acquisition part 31f determines whether or not the machining technology information the request for which has been transmitted by the request transmission part 31e is approved by the machine tool builder and is set as a target of provision. In the case where the machining technology information the request for which has been transmitted by the request transmission part 31e is approved by the machine tool builder and is set as a target of provision, the determination in step S34 is made as YES, and the processing moves to step S35. In the case where the machining technology information the request for which has been transmitted by the request transmission part 31e is neither approved by the machine tool builder nor set as a target of provision, the determination in step S34 is made as NO, and the processing moves to step S36.

In step S35, the consideration processing part 31g executes the processing concerning payment of consideration (such as electronic settlement) for the machining technology information acquired by the machining technology information acquisition part 31f. In step S36, the UI control part 31d displays a message indicating that the machining technology information the request for which has been transmitted by the request transmission part 31e is neither approved by the machine tool builder nor set as a target of provision (message indicating non-approval). After step S36, the machining technology information acquisition processing is repeated. In step S37, the machining technology information acquisition part 31f acquires the machining technology information (machining condition) set as a target of provision from the information management server 10. After step S37, the machining technology information acquisition processing is repeated.

As described above, in the information management system 1 according to the present embodiment, the information management server 10 collects the machining technology information executed by the users using the laser machine, and discloses the machining results of the machining technology information to respective users using the laser machine. Then, in the disclosed machining technology information, the information management system 1 specifies the machining technology information corresponding to the machining result receiving requests a preset threshold number of times or more from respective users using the laser machine, as a target to be verified by the machine tool builder. In the case where the machining technology information is approved and set as a target of provision as a result of the verification by the machine tool builder, the information management system 1 provides the user of the laser machine who has made a request with the machining technology information. At this time, the information management system 1 receives payment of a consideration from the user of the laser machine who receives the machining technology information, and pays the consideration to the user of the laser machine who has provided the machining technology information.

A user who uses the laser machine can receive a consideration when performing provision to other users, and thus motivation increases for provision of the originally executed machining technology information. The machine tool builder is able to set as a target to be verified the machining technology information surely receiving needs when requests have been made a certain number of times or more. Thus, the risk of wasting development to give a guarantee to the machining technology information is reduced. Furthermore, the user of the laser machine who receives the machining technology information is able to execute the machining condition which enables to realize the machining result as required and which is guaranteed by the machine tool builder. Therefore, motivation increases for executing the machining condition provided by other user using the laser machine. Updating of the programs allows the application of the configuration according to the present invention to already shipped machine tools.

As a result, it becomes possible to improve the performance of the laser machine to a higher level. As described above, the information management system 1 according to the present embodiment enables to more appropriately support development and distribution of the machining technology, Modification 1

Figure 14:
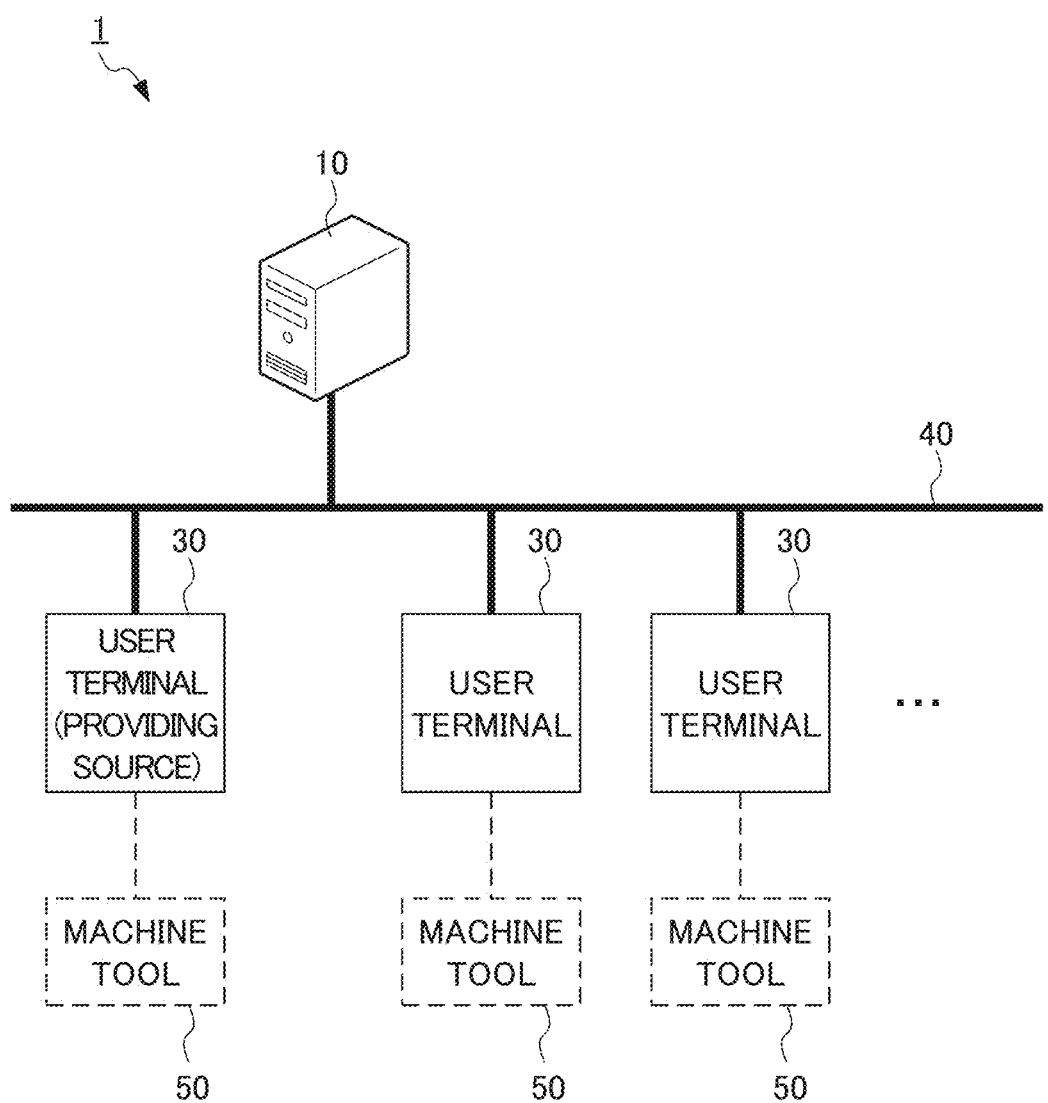
FIG. 14 is a schematic diagram illustrating a system configuration of an information management system in which an information management server operated by a user of a machine tool performs disclosure and provision of the machining technology information not via a machine tool builder.

In the example of the configuration in the above-described embodiment, the information management server 10 collects and discloses the machining technology information, and with respect to the machining technology information disclosed by the information management server 10, in the case where requests have been made a preset threshold number of times or more, the machine tool builder verifies the machining technology information. Alternatively, another configuration is available, in which a user of the laser machine operates the information management server 10, not via the machine tool builder, to perform disclosure and provision of the machining technology information to other users using the laser tool. FIG. 14 is a schematic diagram illustrating a system configuration of the information management system 1 in which the information management server 10 operated by a user of the laser machine performs disclosure and provision of the machining technology information not via the machine tool builder. As shown in FIG. 14, a user UI who develops an original machining condition based on the standard machining condition recommended by the machine tool builder and executes the original machining technology information is able to disclose the machining result in the original machining technology information by the information management server 10. Then, another user U2 using the laser machine 50 makes a request for the machining technology information from the user terminal 30 to the information management server 10, and the information management server 10 provides the user terminal 30 with the requested machining technology information. At this time, the user UI requests the machine tool builder to perform verification for a guarantee, or the user UI himself/herself gives a guarantee or discloses the verification result, and thereby the reliability to the machining technology information may be increased. Such a configuration enables to provide the information management system 1 in a simpler configuration.

Modification 2

In the example of the configuration in the above-described embodiment, with respect to the machining technology information disclosed by the information management server 10, in the case where requests have been made a preset threshold number of times or more, the machine tool builder verifies the machining technology information, and the machining technology information approved by the machine tool builder is set as a target of provision. Alternatively, another configuration is available, in which the information management server 10 collects and discloses the machining technology information, and the machining technology information is transacted (requested and provided) among the users of the laser machine without being approved by the machine tool builder, and thus the transaction result is disclosed along with the machining technology information. FIG. 15 is a schematic diagram illustrating an example of a user interface screen displayed on the user terminal 30 according to the present modification. As shown in FIG. 15, on the user interface screen according to the present modification, items including category of machining technology information, transaction result up to the present (number of purchasing), providing source of machining technology information, contents of machining result, approval status of machining technology information (approval status), and purchase-application button for purchasing machining technology information are respectively displayed for each piece of the machining technology information. A user of the laser machine using the user terminal 30 is able to confirm the contents of the machining result displayed on the user interface screen, and receive the machining technology information by pressing the purchase-application button when desiring the machining condition. As for the approval of the machining technology information, reliability on the machining technology information can be guaranteed through verification even by an entity other than the machine tool builder, having similar credibility (such as an influential user or a consultant). FIG. 15 shows an example in which the machining technology information provided by a company C is approved by a company Z other than the machine tool builder. In this way, accumulation and disclosure of the transaction results of the machining technology information allows to assist verification of the machining technology information by the machine tool builder or the like.

Modification 3

In the example of the configuration in the above-described embodiment, a consideration is paid in money to the user who has provided the machining technology information. Alternatively, the consideration for provision of the machining technology information may be of various added values. In an example, the information recommending the user of the laser machine who has provided the machining technology information may be presented to a machined product ordering side who will order machined products to the user. FIG. 16 is a schematic diagram illustrating an example of a display screen for presenting the information recommending the users of the laser machine who have provided the machining technology information to a machined product ordering side, as a consideration for provision of the machining technology information. On the display screen shown in FIG. 16, items including company name (job shop names) indicating the users of the laser machine who have provided the machining technology information, level of machining skill, appeal information indicating strong point, and a button for obtaining contact information are respectively displayed in a list. Display of the information recommending the users of the laser machine as a consideration for provision of the machining technology information enables to assist order of the machined products to the users of the laser machine, thereby realizing an advertisement effect as a consideration.

Modification 4

In the above-described embodiment, at the time of determination of the consideration of the machining technology information, the amount of the consideration desired by the providing side or purchasing side of the machining technology information may be presented. In this case, in an example, the machine tool builder is able to determine the consideration by referring to the amount of the consideration desired by the user (providing source) of the laser machine who has provided the machining technology information, and perform verification for a guarantee after purchasing the machining technology information, thereby providing other users. The machine tool builder is able to determine the consideration also by referring to the amount of the consideration desired by the user (destination) who receives the machining technology information, thereby providing the machining technology information.

It is noted that the present invention is not limited to the above-described embodiments nor modifications, and various changes and modifications are available. In the example of the above-described embodiment, the information collecting part 11a collects the machining technology information triggered when each of the user terminals 30 makes an application for provision of the machining technology information. However, the invention is not limited to this case.

That is, the information collecting part 11a is able to collect the machining technology information triggered when the machining technology information managed by each of the user terminals 30 is detected to be of other machining conditions than the standard machining conditions recommended by the machine tool builder while being sequentially referenced to. In this case, the machining technology information may be collected with the consent of the users executing the other machining conditions than the standard machining condition recommended by the machine tool builder.

In the above-described embodiment, an entity which is responsible for the operation of the machine tool (such as a leasing company of the machine tool), even being other than the users of the machine tool, may provide or acquire the machining technology information.

In the above-described embodiment, the machining technology information of the machine tool may be subjected to disclosure, provision or the like to other machine tool builder than the builder of the machine tool. In this case, the period of disclosure, provision or the like or the contents of disclosure, provision or the like to other machine tool builder may be limited based on a request from the user who provides the machining technology information or the machine tool builder.

In the above-described embodiment, the machining technology information (machining condition) may be encrypted or compiled into a binary format for provision in order that redistribution or the like of the provided machining technology information is restricted. This enables to effectively protect the machining conditions or machining procedure especially with respect to details subjected to a high speed processing, such as piercing and acute angle machining.

In the above-described embodiment, in the information management server 10, in the case where a user makes a request for the machining technology information, the consideration processing part 11f executes the processing concerning payment of consideration, and then the machining condition provision part 11e provides the machining condition. However, the invention is not limited to this. That is, in the information management server 10, in the case where a user makes a request for the machining technology information, the machining condition provision part 11e may provide the machining condition, and then the consideration processing part 11f may execute the processing concerning payment of consideration.

In the above-described embodiment, in the case where the machining technology information is approved and set as a target of provision as a result of the verification by the machine tool builder, the information management system 1 provides a user of the laser machine who has made a request with the machining technology information. However, the invention is not limited to this. That is, in the case where the machining technology information is approved by the machine tool builder, the machining technology information may be distributed without any charge to the all users who can use the machining technology information in order that the added value of the machine tool is increased. Alternatively, in the case where a new machining condition is developed, the machining technology information (machining condition) may be distributed only to the users who have signed with a charge "machining condition renewal agreement" which makes this machining condition available.

In the above-described embodiment, the information management system 1 may provide means for negotiating a consideration of the machining technology information between the machine tool builder and a user of the machine tool who has the machining condition and/or machining know-hows. In an example, the information management system 1 may have a communication function and the like for negotiating a consideration of the machining technology information between the builder terminal 20 and the user terminal 30 via the information management server 10. In this case, for example, a part of the machining condition, an actually-machined sample or the like is provided by a user prior to the machine tool builder, and thereby the negotiation of a consideration is promoted.

All or a part of the functions of the information management system 1 according to the embodiments described above can be realized by hardware, software or a combination thereof. Realization by software herein means that a function is realized when a processor reads and executes a program. In the case of the configuration with hardware, a part or all of the functions of the information management system 1 may be configured with an integrated circuit (IC), for example, Application Specific Integrated Circuit (ASIC), gate array, Field Programmable Gate Array (FPGA), Complex Programmable Logic Device (CPLD) or the like.

In the case where all or a part of the functions of the information management system 1 are configured with software, a computer which is configured with a storage part for storing programs describing all or a part of the operations of the information management system 1, such as a hard disk, a ROM or the like, a DRAM for storing data necessary for calculation, a CPU, and a bus for connecting respective parts, is capable of realizing such functions with the DRAM storing the information necessary for calculation and the CPU operating the programs.

These programs, which are stored by use of various types of computer readable media, can be supplied to such a computer. The computer readable media include various types of tangible storage media. Examples of the computer readable media include a magnetic recording medium (for example, a flexible disk, a magnetic tape, a hard disk drive), a magneto-optical recording medium (for example, a magneto optical disk), a Read Only Memory (CD-ROM), a CD-R, a CD-R/W, a semiconductor memory (for example, a mask ROM, a Programmable ROM (PROM), an Erasable PROM (EPROM), a flash memory, and a Random Access Memory (RAM). Alternatively, these programs may be distributed by being downloaded to user's computer via a network.

Although the embodiments according to the present invention have been described in detail, the above-described embodiments merely indicate specific examples embodying the present invention. The technical scope of the present invention is not limited to the above-described embodiments. The present invention can be variously modified without departing from the spirit thereof, and such modifications are also included in the technical scope of the present invention.

EXPLANATION OF REFERENCE NUMERALS 1 information management system
10 Information management server
11, 21, 31 CPU
11a information collecting part
11b information disclosure part
11c request acceptance part
11d Machining condition approval part
11e machining condition provision part
11f consideration processing part
21a Specified machining technology information acquisition part
22b verification result input acceptance part
31a machining technology information management part
31b machining technology information provision part
31c Disclosed information acquisition part
31d user interface control part (UI control part)
31e request transmission part
31f machining technology information acquisition part
31g consideration processing part
12, 22, 32 ROM
13, 23, 33 RAM
14, 24, 34 input part
15, 25, 35 display part
16, 26, 36 storage part
16a machining technology database (machining technology DB)
17, 27, 37 Communication part
20 builder terminal
30 user terminal
40 Network
50 Machine tool (laser machine)

What is claimed is:

1. An information management system comprising:
a server for classifying and storing various types of machining technology information of a machine tool; and
one or a plurality of first terminals connected to the server via a network, wherein
the server
discloses a first information classified as a machining result of the machining technology information;
accepts, from each of the first terminals, a request for the disclosed first information; and
provides each of the first terminals with a second information classified as a machining condition of the machining technology information in response to the accepted request, the second information being associated with the first information,
each of the first terminals:
transmits the request for the disclosed first information;
acquires the second information provided in response to the request;
controls a machining tool in accordance with the second information, and
the machining technology information includes the number of requests accepted by the server.

2. The information management system according to claim 1, further comprising a second terminal used by a verifier for verifying the machining condition of the machine tool, wherein
the second terminal transmits, to the server, a verification result indicating whether or not to approve the second information corresponding to the first information relevant to the accepted request, and
when the verification result indicating approval of the second information is transmitted, the server sets the second information as the machining condition as a target of provision.

3. The information management system according to claim 2, wherein
the server further includes a machining condition approval part for specifying the second information associated with the first information as a target to be verified by the second terminal, and the first information is the machining result receiving requests a preset threshold number of times or more, and the second terminal transmits the verification result indicating whether or not to approve the second information specified by the server.

4. The information management system according to claim 1, wherein
the server discloses at least the first information and a number of the requests made for the first information.

5. The information management system according to claim 1, wherein
the server discloses at least the first information and a number of the provided second information corresponding to the first information.

6. The information management system according to claim 1, wherein
the server acquires the first information and the second information corresponding to the first information from the plurality of first terminals.

7. The information management system according to claim 1, wherein
the server executes a processing concerning payment of consideration to a providing source of the second information provided by the server.

8. The information management system according to claim 7, wherein
the server executes a processing concerning payment of money to the providing source of the second information as the processing concerning payment of consideration.

9. The information management system according to claim 7, wherein
the server executes a processing of presenting information for recommending the providing source of the second information as the processing concerning payment of consideration.

10. The information management system according to claim 7, wherein
the server executes the processing concerning payment of consideration based on an amount of a consideration presented by the providing source or a destination of the second information.

11. A server connected to one or a plurality of first terminals via a network, for classifying and storing various types of machining technology information of a machine tool, wherein the server
discloses a first information classified as a machining result of the machining technology information;
accepts, from each of the first terminals, a request for the disclosed first information; and
provides each of the first terminals with a second information classified as a machining condition of the machining technology information in response to the accepted request, the second information being associated with the first information,
at least one of the first user terminals controls a machining tool in accordance with the second information, and
the machining technology information includes the number of requests accepted by the server.

12. An information management method executed in an information management system including a server for classifying and storing various types of machining technology information of a machine tool and one or a plurality of first terminals connected to the server via a network, wherein the server executes:
information disclosure for disclosing a first information classified as machining result of the machining technology information;
request acceptance for accepting from each of the first terminals a request for the first information disclosed in the information disclosure; and
second information provision for providing each of the first terminals with a second information classified as a machining condition of the machining technology information in response to the request accepted in the request acceptance, the second information being associated with the first information,
each of the first terminals executes:
request transmission for transmitting the request for the first information disclosed in the information disclosure;
second information acquisition for acquiring the second information provided in the second information provision in response to the request, the second information being associated with the first information; and
machining tool control for controlling a machining tool in accordance with the second information, and
the machining technology information includes the number of requests accepted by the server.

13. A non-transitory computer-readable storage medium storing a program for a computer including a server connected to one or a plurality of first terminals via a network, the server classifying and storing various types of machining technology information of a machine tool, the program making the computer achieve:
an information disclosure function for disclosing a first information classified as a machining result of the machining technology information;
a request acceptance function for accepting from each of the first terminals a request for the first information disclosed by the information disclosure function; and
a second information provision function for providing each of the first terminals with a second information classified as a machining condition of the machining technology information in response to the request accepted by the request acceptance function, the second information being associated with the first information, wherein
at least one of the first user terminals controls a machining tool in accordance with the second information, and
the machining technology information includes the number of requests accepted by the server.

* * * * *